United States Patent
Binks et al.

(10) Patent No.: US 10,586,543 B2
(45) Date of Patent: Mar. 10, 2020

(54) SOUND CAPTURING AND IDENTIFYING DEVICES

(71) Applicants: Dominic Frank Julian Binks, Cambridge (GB); Sacha Krstulović, Cambridge (GB); Christopher James Mitchell, Ely (GB)

(72) Inventors: Dominic Frank Julian Binks, Cambridge (GB); Sacha Krstulović, Cambridge (GB); Christopher James Mitchell, Ely (GB)

(73) Assignee: AUDIO ANALYTIC LTD (GB)

( * ) Notice: Subject to any disclaimer, the term of this patent is extended or adjusted under 35 U.S.C. 154(b) by 172 days.

(21) Appl. No.: 14/586,169

(22) Filed: Dec. 30, 2014

(65) Prior Publication Data

US 2015/0112678 A1 Apr. 23, 2015

Related U.S. Application Data

(63) Continuation-in-part of application No. 14/533,837, filed on Nov. 5, 2014, now Pat. No. 9,286,911, which (Continued)

(30) Foreign Application Priority Data

Dec. 15, 2008 (GB) .................................. 0822776.1

(51) Int. Cl.
*G10L 17/26* (2013.01)
*G10L 21/0216* (2013.01)
(Continued)

(52) U.S. Cl.
CPC .............. *G10L 17/26* (2013.01); *G10L 15/02* (2013.01); *G10L 21/0216* (2013.01);
(Continued)

(58) Field of Classification Search
CPC ...... G10L 21/0216; G10L 15/02; G10L 17/26; G10L 25/48
(Continued)

(56) References Cited

U.S. PATENT DOCUMENTS 5,025,809 A * 6/1991 Johnson .................... A61B 7/04
600/528
5,142,657 A * 8/1992 Ezawa ....................... G06F 3/16
704/276

(Continued)

FOREIGN PATENT DOCUMENTS

| CN | 1132982 A | 10/1996 |
| CN | 1716329 A | 1/2006 |

(Continued)

OTHER PUBLICATIONS

Goldmann et al.: "*Extracting High Level Semantics by Means of Speech, Audio, and Image Primitives in Surveillance Applications*"; Communication Systems Group, Technical University of Berlin, Einsteinufer 17, 10587 Berlin; 2006 IEEE International Conference, Oct. 8-11, 2006, ISSN: 1522-4880, p. 2397-2400.

(Continued)

*Primary Examiner* — Daniel C Washburn
*Assistant Examiner* — Oluwadamilola M Ogunbiyi
(74) *Attorney, Agent, or Firm* — Tarolli, Sundheim, Covell & Tummino LLP

(57) ABSTRACT

Broadly speaking, embodiments of the present invention provide a device, systems and methods for capturing sounds, generating a sound model (or "sound pack") for each captured sound, and identifying a detected sound using the sound model(s). Preferably, a single device is used to capture a sound, store sound models, and to identify a detected sound using the stored sound models.

32 Claims, 8 Drawing Sheets

Related U.S. Application Data is a continuation of application No. 13/128,588, filed as application No. PCT/GB2009/051606 on Nov. 26, 2009, now Pat. No. 8,918,343.

(51) Int. Cl.
| | |
|---|---|
| *G10L 15/02* | (2006.01) |
| *G08B 31/00* | (2006.01) |
| *G10L 25/48* | (2013.01) |
| *G06N 20/00* | (2019.01) |

(52) U.S. Cl.
CPC .............. *G10L 25/48* (2013.01); *G06N 20/00* (2019.01); *G08B 31/00* (2013.01)

(58) Field of Classification Search
USPC ........................................................ 704/236
See application file for complete search history.

(56) References Cited

U.S. PATENT DOCUMENTS

| | | | | |
|---|---|---|---|---|
| 5,276,629 | A | | 1/1994 | Reynolds |
| 5,387,955 | A | * | 2/1995 | Cocca .................... G03B 17/38 396/312 |
| 5,495,357 | A | * | 2/1996 | Osterhout ................ H04B 1/38 340/4.4 |
| 6,182,018 | B1 | * | 1/2001 | Tran ................... G06K 9/00516 324/76.12 |
| 6,253,174 | B1 | | 6/2001 | Ishii et al. |
| 6,826,528 | B1 | | 11/2004 | Wu et al. |
| 7,369,991 | B2 | * | 5/2008 | Manabe ............. G06K 9/00335 704/235 |
| 7,509,259 | B2 | | 3/2009 | Song |
| 8,140,329 | B2 | * | 3/2012 | Zhang .................... G10L 25/48 704/231 |
| 2001/0029322 | A1 | * | 10/2001 | Iliff ...................... A61B 5/0002 600/300 |
| 2001/0044719 | A1 | | 11/2001 | Casey |
| 2002/0135485 | A1 | | 9/2002 | Arakawa |
| 2003/0035055 | A1 | * | 2/2003 | Baron .................. H04N 1/2112 348/231.4 |
| 2003/0045956 | A1 | * | 3/2003 | Comair ................... A63F 13/10 700/94 |
| 2003/0067440 | A1 | * | 4/2003 | Rank ................... A63F 13/5255 345/156 |
| 2003/0088411 | A1 | | 5/2003 | Ma et al. |
| 2003/0112987 | A1 | | 6/2003 | Nordqvist et al. |
| 2004/0033058 | A1 | * | 2/2004 | Reich ................... H04N 5/2251 386/214 |
| 2005/0251394 | A1 | * | 11/2005 | Carro ................. G06F 16/9558 704/270.1 |
| 2006/0136205 | A1 | | 6/2006 | Song |
| 2006/0227237 | A1 | | 10/2006 | Kienzle et al. |
| 2007/0055500 | A1 | * | 3/2007 | Bilobrov ................ G10L 25/48 704/217 |
| 2008/0001780 | A1 | | 1/2008 | Ohno et al. |
| 2008/0103771 | A1 | * | 5/2008 | Jouvet .................... G10L 15/30 704/250 |
| 2008/0137873 | A1 | * | 6/2008 | Goldstein ............. H04R 1/1016 381/57 |
| 2008/0240458 | A1 | * | 10/2008 | Goldstein ............. H04R 25/453 381/72 |
| 2009/0208913 | A1 | * | 8/2009 | Xu ........................ A61B 5/7264 434/169 |
| 2009/0228422 | A1 | * | 9/2009 | Yen ......................... G10L 17/26 706/52 |
| 2009/0238371 | A1 | * | 9/2009 | Rumsey ............... H04R 29/001 381/58 |
| 2009/0309728 | A1 | * | 12/2009 | Yamamura ......... G08B 13/1672 340/568.1 |
| 2010/0142715 | A1 | * | 6/2010 | Goldstein ............. G06F 16/686 381/56 |
| 2011/0218952 | A1 | | 9/2011 | Mitchell |
| 2012/0224706 | A1 | | 9/2012 | Hwang et al. |
| 2015/0066497 | A1 | | 3/2015 | Sun et al. |
| 2015/0066498 | A1 | | 3/2015 | Ma et al. |
| 2015/0199974 | A1 | | 7/2015 | Bilobrov et al. |

FOREIGN PATENT DOCUMENTS

| | | | |
|---|---|---|---|
| EP | 2685450 | A1 | 1/2014 |
| JP | 2007034198 | A | 2/2007 |
| WO | WO 99/56214 | | 11/1999 |
| WO | WO 2006/075352 | A | 7/2006 |
| WO | WO 2008/016360 | A1 | 2/2008 |
| WO | WO-2008098870 | A1 * | 8/2008 ............. H04L 51/38 |
| WO | WO 2008/139203 | A2 | 11/2008 |

OTHER PUBLICATIONS

Gonzalez: "*Enhancing Video Surveillance with Audio Events*"; Institute for Intelligent Integrated Systems, Griffith University, PMB 50, Gold Coast Mail Centre, QLD, 4217; http://www.scieweavers.org/publications/enhancing-video-surveillance-audio-events.

International Search Report for PCT/GB2009/051606, completed Dec. 22, 2009 by Elko Zimmermann of the EPO.

Mitchell: "*Aligning Music Genre Taxonomies*"; PhD Thesis, Anglia Ruskin University, 2007; pp. 1-225.

Mizobuchi et al.: "*Camera Control System Using Speech Recognition Technology*"; World Conference on Educational Multimedia, Hypermedia and Telecommunications; Jan. 30, 2008, XP002561489, Retrieved from the internet: URL:http://www.editlib.org/p/28649.

Nouza: "*Feature Selection Methods for Hidden Markov Model-Based Speech Recognition*"; 1996, IEEE, p. 186-190.

Sarikaya et al.: "*Robust Speech Activity Detection in the Presence of Noise*"; 19981001, Oct. 1, 1998, p. P922, CP007000673.

Schmandt et al.: "*Listenin' to Domestic Environments from Remote Locations*"; International Conference on Auditory Display, Boston, MA, USA, Jul. 6, 2003-Jul. 9, 2003, XP002561488, Retrieved from the internet: URL:http://www.icad.org.proceedings/2003/SchmandtVallejo2003.pdf.

Tzanetakis et al.: "*Sound Analysis Using MPEG Compressed Audio*"; Acoustics, Speech and Signal Processing, 2000. ICASSP '00. Proceedings S. 2000 IEEE International Conference on Jun. 5-9, 2000, Piscataway, NJ, USA, IEEE, vol. 2, Jun. 5, 2000, pp. 761-764, XP010504834, ISBN: 978-0-7803-6293-2.

Wang, et al.: "*Voice Source Localization for Automatic Camera Pointing System in Videoconferencing*"; 1997, IEEE, p. 187-190.

Chinese Office action for Application No. 200980150365 dated Apr. 3, 2013.

Search Report for G81522609.5 dated Apr. 20, 2016.

\* cited by examiner

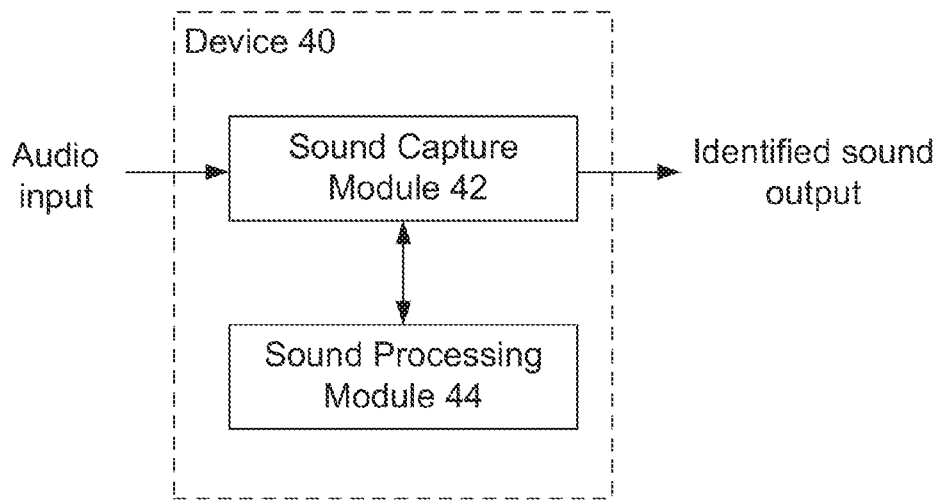
Fig. 4a
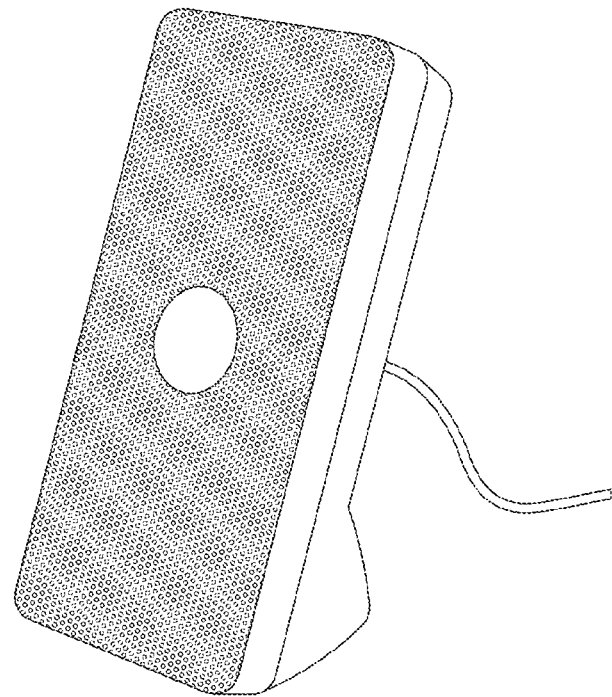
46    Fig. 4b

SOUND CAPTURING AND IDENTIFYING DEVICES

RELATED APPLICATIONS

This application is a continuation-in-part of U.S. patent application Ser. No. 14/533,837, filed 5 Nov. 2014, which is a continuation of U.S. patent application Ser. No. 13/128,588, filed 10 May 2011, which is a U.S. National Stage under 35 USC 371 patent application, claiming priority to Ser. No. PCT/GB2009/051606, filed on 26 Nov. 2009, which claims priority from GB 0822776.1, filed 15 Dec. 2008, all of which are incorporated herein in their entirety.

FIELD OF THE INVENTION

The invention generally relates to devices, systems, methods and computer program code for identifying sounds, and to related applications of such techniques.

BACKGROUND TO THE INVENTION

Background information on sound identification systems and methods can be found in the applicant's PCT application WO2010/070314, which is hereby incorporated by reference in its entirety.

Basic sound identification systems are known but there is a need for improved techniques. The present applicant has recognised the need for sound identification systems which are customisable to identify user-specified sounds.

SUMMARY OF THE INVENTION

According to a first aspect of the invention, there is provided a sound capturing and identifying device, the device comprising: a microphone coupled to the device to detect a sound; an interface for a button wherein the button is configured to, when pressed, cause the device to capture the sound; a memory for storing the captured sound; a communication means for transmitting the captured sound to a remote analytics system located remote to the device; and a processor configured to: store a sound model for the captured sound in the device by: receiving a message indicating the button has been pressed; capturing an example sound detected by the microphone; transmitting the captured example sound to the remote analytics system; and receiving and storing a sound model from the remote analytics system, wherein the sound model corresponds to the captured example sound and comprises parameters which enable the device to identify a detected sound; and analyse a detected sound using the device to identify the sound by: using the stored sound model to identify the detected sound when detected by the microphone.

In a related aspect of the invention there is provided a method of capturing and identifying a sound, the method comprising steps to generate a sound model for a recorded sound by: using a microphone to capture an example sound; transmitting the captured example sound to an analytics system for analysis; and receiving and storing a sound model from the analytics system, wherein the sound model corresponds to the captured example sound and comprises parameters which enable the device to identify a detected sound; the method further comprising steps to analyse a detected sound to identify the sound by: receiving as an input a sound detected by the microphone; and comparing the detected sound to the stored sound model.

The following features apply to both aspects of the invention.

Broadly speaking, embodiments of the present invention provide a device and a method for capturing sounds, generating a sound model (or "sound pack") for each captured sound, and identifying a detected sound using the sound model(s). Preferably, a single device is used to capture a sound, store sound models, and to identify a detected sound using the stored sound models. Advantageously, embodiments of the present invention enable a user to capture sounds specific to their environment (e.g. the sound of their doorbell, the sound of their smoke detector, or the sound of their baby crying etc.), generate sound models for the captured sound, and store the sound models in a device located in the same environment, so that the sounds in their specific environment can be identified. The sounds captured and identified by a device include environmental sounds and may include individual word recognition (e.g. "help", "fire" etc.), but exclude identifying speech (i.e. speech recognition).

In embodiments, the sound model for each captured sound is generated in a remote sound analytics system, such that a captured sound is sent to the remote analytics system for processing, and the remote analytics system returns a sound model to the device. The device may be configured to store user-defined or user-selected actions which are to be taken in response to the identification of a particular sound. This has an advantage that the device which captures and identifies sounds does not require the processing power or any specific software to analyse sounds and generate sound models. Another advantage is that the device stores the sound models locally and so does not need to be in constant communication with the remote system in order to identify a captured sound.

In embodiments, the processor is further configured to analyse a detected sound to identify the sound by: receiving a sound detected by the microphone; and comparing the detected sound to one or more stored sound models.

In embodiments, the interface for the button comprises a physical button on the device. Additionally or alternatively, the interface for the button comprises a virtual button on a user interface.

In embodiments, the user interface is provided on the device. Preferably, the sound capturing and identifying device is coupled to a user device; and the user interface is provided on the user device to control the sound capturing and identifying device.

In embodiments, the device comprises at least one indicator to indicate the progress of the sound capture. The at least one indicator comprises an LED provided on the sound capturing and identifying device. Additionally or alternatively, the at least one indicator is provided on a user interface.

In embodiments, the processor is further configured to: receive an input from a user to associate an action with the sound model; and implement the action when the device identifies the sound corresponding to the sound model.

In embodiments, the action comprises sending a message to a consumer electronics device upon identification of the sound. Additionally or alternative, the action comprises controlling one or more devices coupled to the sound capturing and identifying device.

In embodiments, the processor is further configured to process the captured example sound prior to transmitting the captured example sound to the remote analytics system.

In embodiments, the communication means for transmitting the captured example sound to the remote analytics system is a wired or a wireless communication means.

In embodiments, the device comprises audio analytic software configured to: analyse a sound detected by the microphone; and compare the sound data to one or more stored sound models to identify the detected sound.

In embodiments, the device comprises a sound capture module configured to capture a sound; and a sound processing module configured to store a sound model for the captured sound in the device, and analyse a detected sound using the device to identify the sound.

In embodiments, the functionalities of the sound capture module and the sound processing module are distributed. A single device may be used to perform both the sound capture and the sound processing functions, or these functions may be distributed over separate modules. Thus, one or both of a sound capture module, configured to capture sounds, and a sound processing module, configured to generate sound models for captured sounds, may be provided in a single device, or as separate modules which are accessible by a device.

Alternatively, in embodiments, the device is a dedicated device for capturing and identifying sounds, i.e. it is a single device which is specifically configured to capture sounds and identify sounds. Optionally, the dedicated device may be configured to generate sound models for captured sounds.

Preferably, whether the sounds are captured by distributed modules or a single dedicated device, the sounds captured and identified by the device exclude speech recognition.

In embodiments, the method comprises providing a device with access to audio analytic software configured to analyse the sound detected by the microphone. Preferably, the device comprises an interactive software application having access to the audio analytic software, wherein the interactive software application is configured to enable user interaction with the device to generate the sound model for the recorded sound.

In embodiments, the interactive software application is configured to: receive an input from a user to associate an action with the generated sound model; and implement the action when the device identifies the sound corresponding to the sound model. The user may select the action from a pre-defined list, which may include options such as "send an SMS message", "send an email", "call a number", "contact the emergency services", "contact a security service", and/or provide a visual indication of the sound identification on a device.

In a related aspect of the invention there is provided a non-transitory data carrier carrying processor control code which when running on a device causes the device to perform the method described above.

It will be appreciated that the functionality of the sound capture module, the sound model generation module and the sound identification module may be divided across several modules. Alternatively, the functionality may be provided in a single module or a processor. The or each processor may be implemented in any known suitable hardware such as a microprocessor, a Digital Signal Processing (DSP) chip, an Application Specific Integrated Circuit (ASIC), Field Programmable Gate Arrays (FPGAs), etc. The or each processor may include one or more processing cores with each core configured to perform independently. The or each processor may have connectivity to a bus to execute instructions and process information stored in, for example, a memory.

In a further aspect of the invention, there is provided a system for generating a sound model, the system comprising: one or more sound capture and/or processing modules configured to: capture an example sound; store a sound model corresponding to the captured example sound; and analyse a detected sound using the stored sound model; and a sound model generating module.

The following features apply to all aspects of the invention.

In embodiments, the system further comprises a communication channel through which: a sound captured by the device is sent from the one or more sound capture and/or processing modules to the sound model generating module for analysis; and the sound model generated by the sound model generating module is returned to the device.

In embodiments, the sound model generating module is provided in a remote server or a network of remote servers hosted on the Internet, and a sound recorded by the device is sent to the remote server(s) for analysis.

Preferably, the sound model generating module analyses a sound recorded by the device, and generates a sound model comprising a set of parameters which characterise the recorded sound.

In embodiments, the one or more sound capture and/or processing modules is further configured to: receive as an input a detected sound; and compare the detected sound to one or more stored sound models to identify the detected sound.

In embodiments, the one or more sound capture and/or processing modules is further configured to: receive an input from a user to associate an action with a sound model; and implement the action when the sound is identified as corresponding to the stored sound models.

The invention further provides processor control code to implement the above-described systems and methods, for example on a general purpose computer system or on a digital signal processor (DSP). The invention also provides a non-transitory data carrier carrying processor control code to, when running, implement any of the above methods, such as a disk, microprocessor, CD- or DVD-ROM, or programmed memory such as non-volatile memory (e.g. Flash) or read-only memory (Firmware). Code (and/or data) to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language). As the skilled person will appreciate such code and/or data may be distributed between a plurality of coupled components in communication with one another. The invention may comprise a controller which includes a microprocessor, working memory and program memory coupled to one or more of the components of the system.

BRIEF DESCRIPTION OF THE DRAWINGS

The invention is diagrammatically illustrated, by way of example, in the accompanying drawings, in which:

FIG. 4a shows a schematic of a system configured to capture and identify sounds in an embodiment of the invention;

FIG. 4b is an illustration of a smart microphone configured to capture and identify sounds in an embodiment of the invention.

DETAILED DESCRIPTION OF THE DRAWINGS

Broadly speaking, embodiments of the present invention provide a device, systems and methods for capturing sounds, generating a sound model (or "sound pack") for each captured sound, and identifying a detected sound using the sound model(s). Preferably, a single device is used to capture a sound, store sound models, and to identify a detected sound using the stored sound models.

In embodiments, the sound model for each captured sound is generated in a remote sound analytics system, such that a captured sound is sent to the remote analytics system for processing, and the remote analytics system returns a sound model to the device. Additionally or alternatively, the sound analytics function is provided on the device which captures sound, via an analytics module located within the device itself.

An advantage of embodiments of the invention is that a user of the device may use the device to capture sounds specific to their environment (e.g. the sound of their doorbell, the sound of their smoke detector, or the sound of their baby crying etc.) so that the sounds in their specific environment can be identified. Thus, a user can use the device to capture the sound of their smoke detector, obtain a sound model for this sound (which is stored on the device) and to define an action to be taken in response to the sound being identified, such as "send an SMS message to my phone". In this example, a user who is away from their home can be alerted to his smoke alarm ringing in his home. This and other examples are described in more detail below.

Preferably, in embodiments, the sounds captured and identified by a device include environmental sounds (e.g. a baby crying, broken glass, car alarms, smoke alarms, doorbells, etc.), and may include individual word recognition (e.g. "help", "fire" etc.) but exclude identifying speech (i.e. speech recognition).

1. Sound Capture and Identification

Figure 1A:
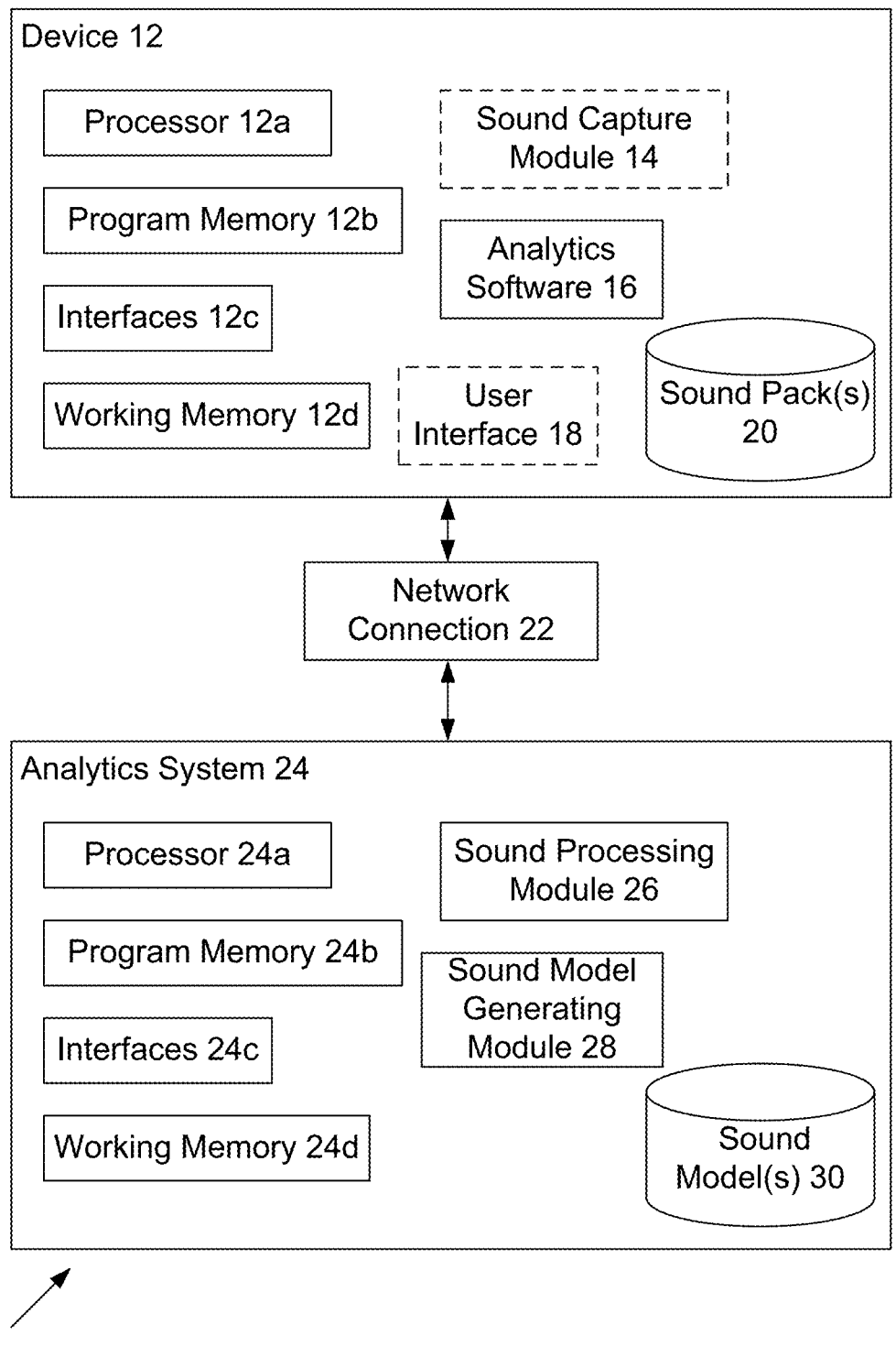
FIG. 1a shows a block diagram of a general system to generate sound models and identify detected sounds in an embodiment of the invention.

FIG. 1a shows a block diagram of a general system 10 to generate sound models and identify detected sounds in an embodiment of the invention. A device 12 is used to capture a sound, store a sound model associated with the captured sound, and use the stored sound model to identify detected sounds. The device 12 can be used to capture more than one sound and to store the sound models associated with each captured sound. The device 12 may be a PC, a mobile computing device such as a laptop, smartphone, tablet-PC, a consumer electronics device (e.g. a webcam, a smart microphone, etc.) or other electronics device (e.g. a security camera). The device comprises a processor 12a coupled to program memory 12b storing computer program code to implement the sound capture and sound identification, to working memory 12d and to interfaces 12c such as a screen, one or more buttons, keyboard, mouse, touchscreen, and network interface.

The processor 12a may be an ARM® device. The program memory 12b, in embodiments, stores processor control code to implement functions, including an operating system, various types of wireless and wired interface, storage and import and export from the device.

In particular embodiments, the device 12 comprises a user interface 18 to enable the user to, for example, associate an action with a particular sound. The user interface 18 may, in other embodiments, be provided via a second device (not shown), as explained in more detail with respect to FIG. 5 below. A wireless interface, for example a Bluetooth®, Wi-Fi or near field communication (NFC) interface is provided for interfacing with other devices and the analytics system 24.

The device 12 may, in embodiments, comprise a sound capture module 14, such as a microphone and associated software. In other embodiments, the sound capture module 14 may be provided via a separate device (not shown), such that the function of capturing sounds is performed by a separate device. This is described in more detail with reference to FIG. 4a below.

The device 12 comprises a data store 20 storing one or more sound models (or "sound packs"). In embodiments, the sound model for each captured sound is generated in a remote sound analytics system 24, such that a captured sound is sent to the remote analytics system for processing, and the remote analytics system returns a sound model to the device. The device 12 may be configured to store user-defined or user-selected actions which are to be taken in response to the identification of a particular sound. This has an advantage that the device 12 which captures and identifies sounds does not require the processing power or any specific software to analyse sounds and generate sound models.

Another advantage is that the device 12 stores the sound models locally (in data store 20) and so does not need to be in constant communication with the remote system 24 in order to identify a captured sound.

Thus, the sound models are obtained from the analytics system 24 and stored within the device 12 (specifically within data store 20) to enable sounds to be identified using the device, without requiring the device to be connected to the analytics system. The device 12 also comprises analytics software 16 which is used to identify a detected sound, by comparing the detected sound to the sound models (or "sound packs") stored in the data store 20. In the embodiment of FIG. 1a, the analytics software is not configured to generate sound models for captured sounds, but merely to identify sounds using the stored sound models. The device 12 comprises a networking interface to enable communication with the analytics system 24 via the appropriate network connection 22 (e.g. the Internet). Captured sounds, for which sound models are to be generated, are sent to the analytics system 24 via the network connection 22.

In FIG. 1a, the analytics system 24 is located remote to the device 12. The analytics system 24 may be provided in a remote server, or a network of remote servers hosted on the Internet (e.g. in the Internet cloud), or in a device/system provided remote to device 12. For example, device 12 may be a computing device in a home or office environment, and the analytics system 24 may be provided within a separate device within the same environment. The analytics system 24 comprises at least one processor 24a coupled to program memory 24b storing computer program code to implement the sound model generation method, to working memory 24d and to interfaces 24c such as a network interface. The analytics system 24 comprises a sound processing module 26 configured to analyse and process captured sounds received from the device 12, and a sound model generating module 28 configured to create a sound model (or "sound pack") for a sound analysed by the sound processing module 26. In embodiments, the sound processing module 26 and sound model generating module 28 are provided as a single module.

The analytics system 24 further comprises a data store 30 containing sound models generated for sounds received from one or more devices 12 coupled to the analytics system 24. The stored sound models may be used by the analytics system 24 (i.e. the sound processing module 26) as training for other sound models, to perform quality control of the process to provide sound models, etc.

Figure 1B:
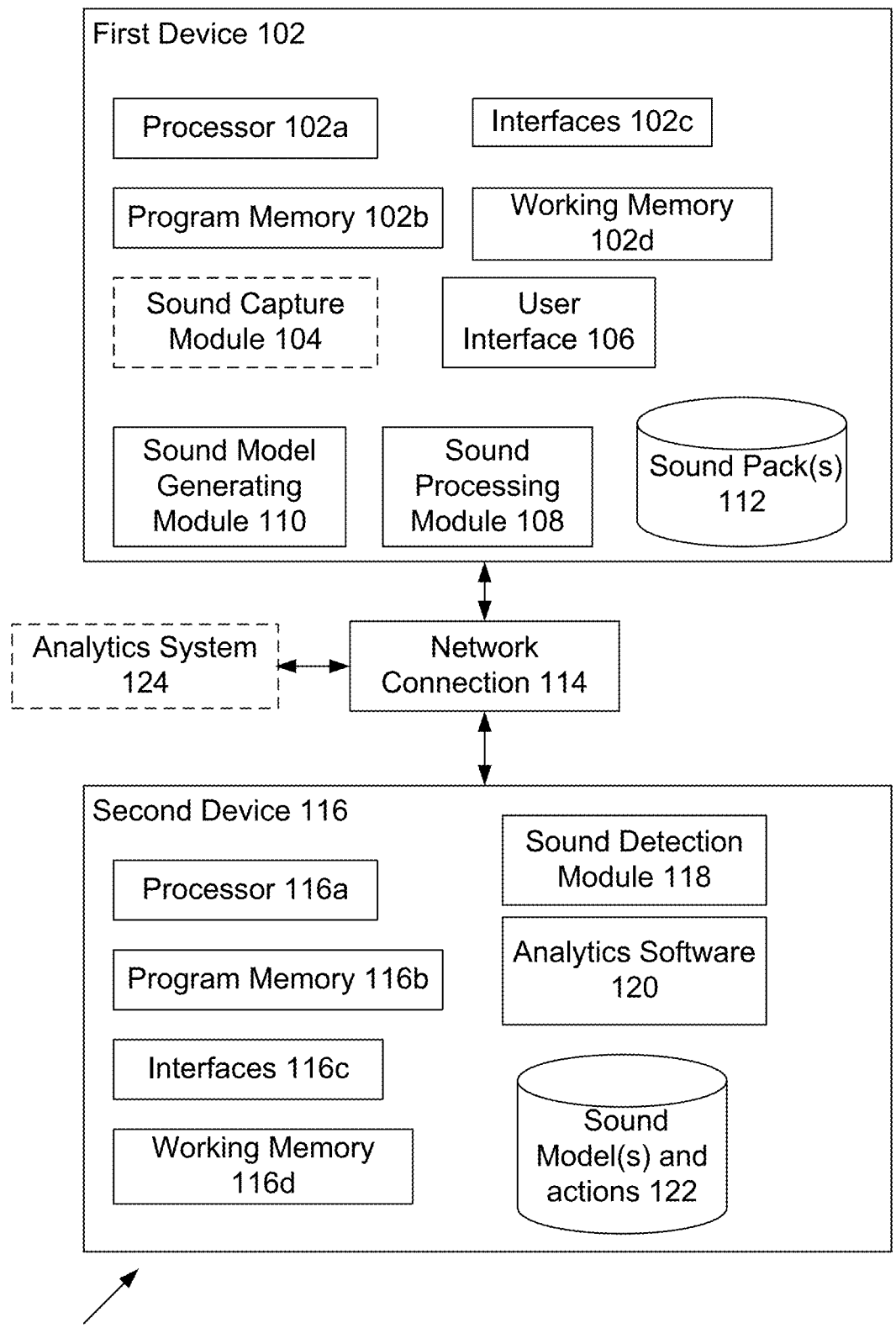
FIG. 1b shows a block diagram of a general system to generate sound models and identify detected sounds in a further embodiment of the invention.

FIG. 1b shows a block diagram of a general system 100 to generate sound models and identify detected sounds in a further embodiment of the invention. In this embodiment, a first device 102 is used to capture a sound, generate a sound model for the captured sound, and store the sound model associated with the captured sound. The sound models generated locally by the first device 102 are provided to a second device 116, which is used to identify detected sounds. The first device 102 of FIG. 1b therefore has the processing power required to perform the sound analysis and sound model generation itself, in contrast with the device of FIG. 1a, and thus a remote analytics system is not required to perform sound model generation.

The first device 102 can be used to capture more than one sound and to store the sound models associated with each captured sound. The first device 102 may be a PC, a mobile computing device such as a laptop, smartphone, tablet-PC, a consumer electronics device (e.g. a webcam, a smart microphone, a smart home automation panel etc.) or other electronics device. The first device comprises a processor 102a coupled to program memory 102b storing computer program code to implement the sound capture and sound model generation, to working memory 102d and to interfaces 102c such as a screen, one or more buttons, keyboard, mouse, touchscreen, and network interface.

The processor 102a may be an ARM® device. The program memory 102b, in embodiments, stores processor control code to implement functions, including an operating system, various types of wireless and wired interface, storage and import and export from the device.

The first device 102 comprises a user interface 106 to enable the user to, for example, associate an action with a particular sound. The user interface may be display screen, which requires a user to interact with it via an intermediate device such as a mouse or touchpad, or may be a touchscreen. A wireless interface, for example a Bluetooth®, Wi-Fi or near field communication (NFC) interface is provided for interfacing with the second device 116 and optionally, with a remote analytics system 124. In embodiments, although the first device 102 has the capability to analyse sounds and generate sound models itself, the first device 102 may still communicate with a remote analytics system 124. For example, the first device 102 may provide the captured sounds and/or the locally-generated sound models to the remote analytics system 124 for quality control purposes or to perform further analysis on the captured sounds. Advantageously, the analysis performed by the remote system 124, based on the captured sounds and/or sound models generated by each device coupled to the remote system 124, may be used to update the software and analytics used by the first device 102 to generate sound models. The analytics system 124 may therefore comprise at least one processor, program memory storing computer program code to analyse captured sounds, working memory, interfaces such as a network interface, and a data store containing sound models received from one or more devices coupled to the analytics system 124.

The first device 102 may, in embodiments, comprise a sound capture module 104, such as a microphone and associated software. In other embodiments, the sound capture module 104 may be provided via a separate device (not shown), such that the function of capturing sounds is performed by a separate device. In either case, the first device 102 receives a sound for analysis.

The first device 102 comprises a sound processing module 108 configured to analyse and process captured sounds, and a sound model generating module 110 configured to create a sound model (or "sound pack") for a sound analysed by the sound processing module 108. In embodiments, the sound processing module 108 and sound model generating module 110 are provided as a single module. The first device 102 further comprises a data store 112 storing one or more sound models (or "sound packs"). The first device 102 may be configured to store user-defined or user-selected actions which are to be taken in response to the identification of a particular sound. The user interface 106 is used to input user-selected actions into the first device 102.

The sound models generated by the sound model generating module 110 of device 102 are provided to the second device 116 to enable the second device to identify detected sounds. The second device 116 may be a PC, a mobile computing device such as a laptop, smartphone, tablet-PC, a consumer electronics device or other electronics device. In a particular embodiment, the first device 102 may be a smart panel (e.g. a home automation system/device) or computing device located within a home or office, and the second device 116 may be an electronics device located elsewhere in the home or office. For example, the second device 116 may be a security system.

The second device 116 receives sound packs from the first device 102 and stores them locally within a data store 122. The second device comprises a processor 116a coupled to program memory 116b storing computer program code to implement the sound capture and sound identification, to working memory 116d and to interfaces 116c such as a screen, one or more buttons, keyboard, mouse, touchscreen, and network interface. The second device 116 comprises a sound detection module 118 which is used to detect sounds. Analytics software 120 stored on the second device 116 is configured to analyse the sounds detected by the detection module 118 by comparing the detected sounds to the stored sound model(s). The data store 122 may also comprise user-defined actions for each sound model. In the example embodiment where the second device 116 is a security system (comprising at least a security camera), the second device 116 may detect a sound, identify it as the sound of breaking glass (by comparing the detected sound to a sound model of breaking glass) and in response, perform the user-defined action to swivel a security camera in the direction of the detected sound.

The processor 116a may be an ARM® device. The program memory 116b, in embodiments, stores processor control code to implement functions, including an operating system, various types of wireless and wired interface, storage and import and export from the device. The second device 116 comprises a wireless interface, for example a Bluetooth®, Wi-Fi or near field communication (NFC) interface, for interfacing with the first device 102 via network connection 114.

An advantage of the embodiment of FIG. 1b is that the second device 116 stores the sound models locally (in data store 122) and so does not need to be in constant communication with a remote system 124 or the first device 102 in order to identify a detected sound.

Figure 1C:
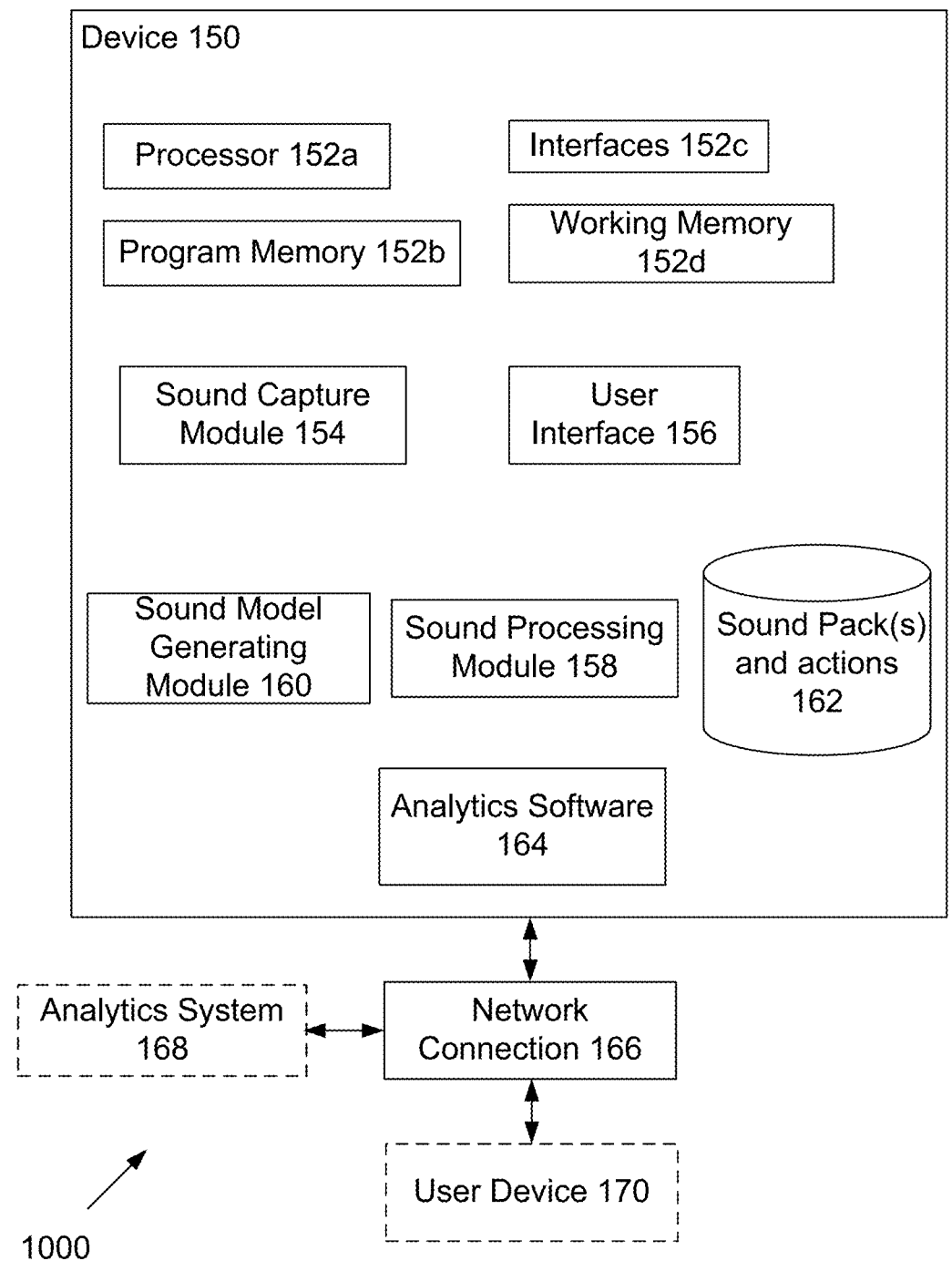
FIG. 1c shows a block diagram of a general system to generate sound models and identify detected sounds in a further embodiment of the invention.

FIG. 1c shows a block diagram of a general system 1000 to generate sound models and identify detected sounds in a further embodiment of the invention. In this embodiment, a device 150 is used to capture a sound, generate a sound model for the captured sound, store the sound model associated with the captured sound, and identify detected sounds. The sound models generated locally by the device 150 are used by the same device to identify detected sounds. The device 150 of FIG. 1c therefore has the processing power required to perform the sound analysis and sound model generation itself, in contrast with the device of FIG. 1a, and thus a remote analytics system is not required to perform sound model generation. A specific example of this general system 1000 is described below in more detail with reference to FIG. 5.

In FIG. 1c, the device 150 can be used to capture more than one sound and to store the sound models associated with each captured sound. The device 150 may be a PC, a mobile computing device such as a laptop, smartphone, tablet-PC, a consumer electronics device (e.g. a webcam, a smart microphone, a smart home automation panel etc.) or other electronics device. The device comprises a processor 152a coupled to program memory 152b storing computer program code to implement the methods to capture sound, generate sound models and identify detected sounds, to working memory 152d and to interfaces 152c such as a screen, one or more buttons, keyboard, mouse, touchscreen, and network interface.

The processor 152a may be an ARM® device. The program memory 152b, in embodiments, stores processor control code to implement functions, including an operating system, various types of wireless and wired interface, storage and import and export from the device.

The first device 150 comprises a user interface 156 to enable the user to, for example, associate an action with a particular sound. The user interface may be display screen, which requires a user to interact with it via an intermediate device such as a mouse or touchpad, or may be a touchscreen. A wireless interface, for example a Bluetooth®, Wi-Fi or near field communication (NFC) interface is provided for interfacing with a user device 170 and optionally, with a remote analytics system 168. In embodiments, although the device 150 has the capability to analyse sounds, generate sound models itself and identify detected sounds, the device 150 may also be coupled to a remote analytics system 168. For example, the device 150 may provide the captured sounds and/or the locally-generated sound models to the remote analytics system 168 for quality control purposes or to perform further analysis on the captured sounds. Advantageously, the analysis performed by the remote system 168, based on the captured sounds and/or sound models generated by each device coupled to the remote system 1268, may be used to update the software and analytics used by the device 150 to generate sound models. The device 150 may be able to communicate with a user device 170 to, for example, alert a user to a detected sound. A user of device 150 may specify, for example, that the action to be taken in response to a smoke alarm being detected by device 150 is to send a message to user device 170 (e.g. an SMS message or email). This is described in more detail with reference to FIG. 5 below.

The device 150 may, in embodiments, comprise a sound capture module 154, such as a microphone and associated software. In other embodiments, the sound capture module 154 may be provided via a separate device (not shown) coupled to the device 150, such that the function of capturing sounds is performed by a separate device. In either case, the device 150 receives a sound for analysis. The device 150 comprises a sound processing module 158 configured to analyse and process captured sounds, and a sound model generating module 160 configured to create a sound model (or "sound pack") for a sound analysed by the sound processing module 158. In embodiments, the sound processing module 158 and sound model generating module 160 are provided as a single module. The device 150 further comprises a data store 162 storing one or more sound models (or "sound packs"). The device 150 may be configured to store user-defined or user-selected actions which are to be taken in response to the identification of a particular sound in data store 162. The user interface 156 is used to input user-selected actions into the device 150.

The sound models generated by the sound model generating module 160 are used by device 150 to identify detected sounds. An advantage of the embodiment of FIG. 1c is that a single device 150 stores the sound models locally (in data store 162) and so does not need to be in constant communication with a remote system 168 in order to identify a detected sound.

2. Sound Model Generation

Figure 2A:
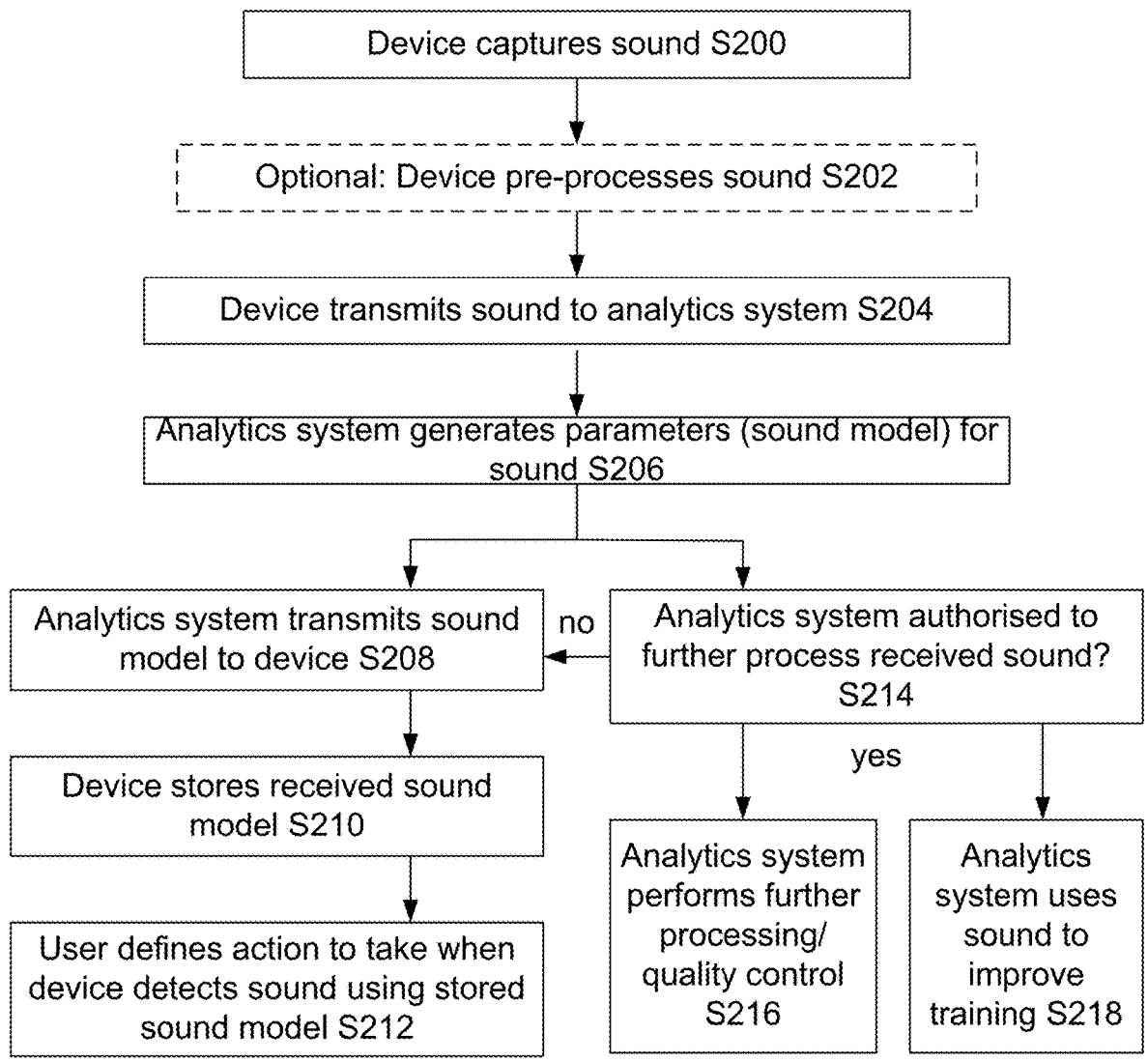
FIG. 2a is a flow chart showing example steps of a process to generate a sound model for a captured sound.

FIG. 2a is a flow chart showing example steps of a process to generate a sound model for a captured sound, where the sound analysis and sound model generation is performed in a system/device remote to the device which captures the sound. A device, such as device 12 in FIG. 1a, captures a sound (S200) and transmits the captured sound to a remote analytics system (S204). As mentioned earlier, the analytics system may be provided in a remote server, or a network of remote servers hosted on the Internet (e.g. in the Internet cloud), or in a device/system provided remote to the device which captures the sound. For example, the device may be a computing device in a home or office environment, and the analytics system may be provided within a separate device within the same environment, or may be located outside that environment and accessible via the Internet.

Preferably, the same sound is captured more than once by the device in order to improve the reliability of the sound model generated of the captured sound. The device may prompt the user to, for example, play a sound (e.g. ring a doorbell, test their smoke alarm, etc.) multiple times (e.g. three times), so that it can be captured multiple times. The device may perform some simple analysis of the captured sounds to check that the same sound has been captured, and if not, may prompt the user to play the sound again so it can be recaptured.

Optionally, the device may pre-process the captured sound (S202) before transmission to the analytics system. The pre-processing may be used to compress the sound, e.g. using a modified discrete cosine transform, to reduce the amount of data being sent to the analytics system.

The analytics system processes the captured sound(s) and generates parameters for the specific captured sound (S206). The sound model generated by the analytics system comprises these generated parameters and other data which can be used to characterise the captured sound. The sound model is supplied to the device (S208) and stored within the device (S210) so that it can be used to identify detected sounds. Preferably, a user defines an action to take when a particular sound is identified, such that the action is associated with a sound model (S212). For example, a user may specify that if a smoke alarm is detected, the device sends a message to a user's phone and/or to the emergency services. Another example of a user specified action is to send a message to or place a call to the user's phone in response to the detection of the user's doorbell. This may be useful if the user is in his garden or garage and out of earshot of his doorbell.

A user may be asked if the captured sound can be used by the analytics system to improve the models and analytics used to generate sound models. If the user has provided approval (e.g. on registering to use the analytics system), the analytics system performs further processing of the captured sounds and/or performs quality control (S216). The analytics system may also use the captured sounds received from each device coupled to the system to improve model generation, e.g. by using the database of sounds a training for other sound models (S218). The analytics system may itself generate sound packs, which can be downloaded/obtained by users of the system, based on popular captured sounds.

In the embodiments shown in FIGS. 1b and 1c, all of steps S200 to S212 are instead performed on the device which captures the sound. In these embodiments, the captured sounds and locally generated sound models may be sent to the analytics system for further analysis/quality control (S216) and/or to improve the software/analysis techniques used to generate sound models (S218). The improved software/analysis techniques are sent back to the device which generates sound models.

Preferably, the user defines an action for each captured sound for which a model is generated from a pre-defined list. The list may include options such as "send an SMS message", "send an email", "call a number", "contact the emergency services", "contact a security service", which may further require a user to specify a phone number or email address to which an alert is sent. Additionally or alternatively, the action may be to provide a visual indication on the device itself, e.g. by displaying a message on a screen on the device and/or turning on or flashing a light or other indicator on the device, and/or turning on an alarm on the device, etc.

There are a number of ways a sound model for a captured sound can be generated. The analytics system may use a statistical Markov model for example, where the parameters generated to characterise the captured sound are hidden Markov model (HMM) parameters. Additionally or alternatively, the sound model for a captured sound may be generated using machine learning techniques or predictive modelling techniques such as: neural networks, support vector machine (SVM), decision tree learning, etc.

The applicant's PCT application WO2010/070314, which is incorporated by reference in its entirety, describes in detail various methods to identify sounds. Broadly speaking an input sample sound is processed by decomposition into frequency bands, and optionally de-correlated, for example, using PCA/ICA, and then this data is compared to one or more Markov models to generate log likelihood ratio (LLR) data for the input sound to be identified. A (hard) confidence threshold may then be employed to determine whether or not a sound has been identified; if a "fit" is detected to two or more stored Markov models then preferably the system picks the most probable. A sound is "fitted" to a model by effectively comparing the sound to be identified with expected frequency domain data predicted by the Markov model. False positives are reduced by correcting/updating means and variances in the model based on interference (which includes background) noise.

There are several practical considerations when trying to detect sounds from compressed audio formats in a robust and scalable manner. Where the sound stream is uncompressed to PCM (pulse code modulated) format and then passed to a classification system, the first stage of an audio analysis system may be to perform a frequency analysis on the incoming uncompressed PCM audio data. However, the recently compressed form of the audio may contain a detailed frequency description of the audio, for example where the audio is stored as part of a lossy compression system. By directly utilising this frequency information in the compressed form, i.e., sub-band scanning in an embodiment of the above still further aspect, a considerable computational saving may be achieved by not uncompressing and then frequency analysing the audio. This may mean a sound can be detected with a significantly lower computational requirement. Further advantageously, this may make the application of a sound detection system more scalable and enable it to operate on devices with limited computational power which other techniques could not operate on.

The digital sound identification system may comprise discrete cosine transform (DCT) or modified DCT coefficients. The compressed audio data stream may be an MPEG standard data stream, in particular an MPEG 4 standard data stream.

The sound identification system may work with compressed audio or uncompressed audio. For example, the time-frequency matrix for a 44.1 KHz signal might be a 1024 point FFT with a 512 overlap. This is approximately a 20 milliseconds window with 10 millisecond overlap. The resulting 512 frequency bins are then grouped into sub bands, or example quarter-octave ranging between 62.5 to 8000 Hz giving 30 sub-bands.

A lookup table is used to map from the compressed or uncompressed frequency bands to the new sub-band representation bands. For the sample rate and STFT size example given the array might comprise of a (Bin size÷2)×6 array for each sampling-rate/bin number pair supported. The rows correspond to the bin number (centre)—STFT size or number of frequency coefficients. The first two columns determine the lower and upper quarter octave bin index numbers. The following four columns determine the proportion of the bins magnitude that should be placed in the corresponding quarter octave bin starting from the lower quarter octave defined in the first column to the upper quarter octave bin defined in the second column. e.g. if the bin overlaps two quarter octave ranges the 3 and 4 columns will have proportional values that sum to 1 and the 5 and 6 columns will have zeros. If a bin overlaps more than one sub-band more columns will have proportional magnitude values. This example models the critical bands in the human auditory system. This reduced time/frequency representation is then processed by the normalisation method outlined. This process is repeated for all frames incrementally moving the frame position by a hop size of 10 ms. The overlapping window (hop size not equal to window size) improves the time-resolution of the system. This is taken as an adequate representation of the frequencies of the signal which can be used to summarise the perceptual characteristics of the sound. The normalisation stage then takes each frame in the sub-band decomposition and divides by the square root of the average power in each sub-band. The average is calculated as the total power in all frequency bands divided by the number of frequency bands. This normalised time frequency matrix is the passed to the next section of the system where its mean, variances and transitions can be generated to fully characterise the sound's frequency distribution and temporal trends. The next stage of the sound characterisation requires further definitions. A continuous hidden Markov model is used to obtain the mean, variance and transitions needed for the model. A Markov model can be completely characterised by $\lambda=(A, B, \Pi)$ where A is the state transition probability matrix, B is the observation probability matrix and $\Pi$ is the state initialisation probability matrix. In more formal terms:

$$A=\lfloor a_{ij} \rfloor \text{ where } a_{ij} \equiv P(q_{t+1}=S_j|q_t=S_i)$$

$$B=\lfloor b_j(m) \rfloor \text{ where } b_j(m) \equiv P(O_t=v_m|q_t=S_j)$$

$$\Pi=[\pi_i] \text{ where } \pi_i \equiv P(q_1=S_i)$$

where q is the state value, O is the observation value. A state in this model is actually the frequency distribution characterised by a set of mean and variance data. However, the formal definitions for this will be introduced later. Generating the model parameters is a matter of maximising the probability of an observation sequence. The Baum-Welch algorithm is an expectation maximisation procedure that has been used for doing just that. It is an iterative algorithm where each iteration is made up of two parts, the expectation $\varepsilon_t(i, j)$ and the maximisation $\gamma_t(i)$. In the expectation part, $\varepsilon_t(i, j)$ and $\gamma_t(i)$, are computed given $\lambda$, the current model values, and then in the maximisation $\lambda$ is step recalculated. These two steps alternate until convergence occurs. It has been shown that during this alternation process, $P(O|\lambda)$ never decreases. Assume indicator variables $z_i^t$ as Expectation $$\varepsilon_t(i, j) = \frac{\alpha_t(i)a_{ij}b_j(O_{t+1})\beta_{t+1}(j)}{\sum_k \sum_l \alpha(k)a_{kl}b_l(O_{t+1})\beta_{t+1}(l)}$$

$$\gamma_t(i) = \sum_{j=1}^{N} \varepsilon_t(i, j)$$

$$E[z_i^t] = \gamma_t(i) \text{ and } [z_{ij}^t] = \varepsilon_t(i, j)$$

$$z_i^t = \begin{cases} 1 & \text{if } q_t = S_i \\ 0 & \text{otherwise} \end{cases}$$

$$z_{ij}^t = \begin{cases} 1 & \text{if } q_t = S_i \text{ and } q_{t+1} = S_j \\ 0 & \text{otherwise} \end{cases}$$

Maximisation $$\hat{a}_{ij} = \frac{\sum_{k=1}^{K} \sum_{t=1}^{T_k-1} \varepsilon_t^k(i, j)}{\sum_{k=1}^{K} \sum_{t=1}^{T_k-1} \gamma_t^k(i)}$$

$$\hat{b}_j(m) = \frac{\sum_{k=1}^{K} \sum_{t=1}^{T_k-1} \gamma_t^k(j) 1(O_t^k = v_m)}{\sum_{k=1}^{K} \sum_{t=1}^{T_k-1} \gamma_t^k(j)}$$

$$\hat{\pi} = \frac{\sum_{k=1}^{K} \gamma_1^k(i)}{K}$$

Gaussian mixture models can be used to represent the continuous frequency values, and expectation maximisation equations can then be derived for the component parameters (with suitable regularisation to keep the number of parameters in check) and the mixture proportions. Assume a scalar continuous frequency value, $O_t \in R$ with a normal distribution $$p(O_t|q_t=S_j,\lambda) \sim N(\mu_j,\sigma_j^2)$$

This implies that in state $S_j$, the frequency distribution is drawn from a normal distribution with mean $\mu_j$ and variance $\sigma_j^2$. The maximisation step equation is then $$\hat{\mu}_j = \frac{\sum_t \gamma_t(j)O_t}{\sum_t \gamma_t(j)}$$

$$\hat{\sigma}_j^2 = \frac{\sum_t \gamma_t(j)(O_{t-1} - \hat{\mu}_j)^2}{\sum_t \gamma_t(j)}$$

The use of Gaussians enables the characterisation of the time-frequency matrix's features. In the case of a single Gaussian per state, they become the states. The transition matrix of the hidden Markov model can be obtained using the Baum-Welch algorithm to characterise how the frequency distribution of the signal change over time.

The Gaussians can be initialised using K-Means with the starting points for the clusters being a random frequency distribution chosen from sample data.

To classify new sounds and adapt for changes in the acoustic conditions, a forward algorithm can be used to determine the most likely state path of an observation sequence and produce a probability in terms of a log likelihood that can be used to classify and incoming signal. The forward and backward procedures can be used to obtain this value from the previously calculated model parameters. In fact only the forward part is needed. The forward variable $\alpha_t(i)$ is defined as the probability of observing the partial sequence $\{O_1 \ldots O_t\}$ until time t and being in $S_i$ at time t, given the model $\lambda$.

$$\alpha_t(i) \equiv P(O_1 \ldots O_t, q_t=S_i|\lambda)$$

This can be calculated by accumulating results and has two steps, initialisation and recursion. $\alpha_t(i)$ explains the first t observations and ends in state $S_i$. This is multiplied by the probability $\alpha_{ij}$ of moving to state $S_j$, and because there are N possible previous states, there is a need to sum over all such possible previous $S_i$. The term $b_j(O_{t+1})$ is then the probability of generating the next observation, frequency distribution, while in state $S_j$ at time t+1. With these variables it is then straightforward to calculate the probability of a frequency distribution sequence.

$$P(O \mid \lambda) = \sum_{i=1}^{N} \alpha_T(i)$$

Computing $\alpha_t(i)$ has order $O(N^2T)$ and avoids complexity issues of calculating the probability of the sequence. The models will operate in many different acoustic conditions and as it is practically restrictive to present examples that are representative of all the acoustic conditions the system will come in contact with, internal adjustment of the models will be performed to enable the system to operate in all these different acoustic conditions. Many different methods can be used for this update. For example, the method may comprise taking an average value for the sub-bands, e.g. the quarter octave frequency values for the last T number of seconds. These averages are added to the model values to update the internal model of the sound in that acoustic environment.

3. Identify Detected Sounds

Figure 2B:
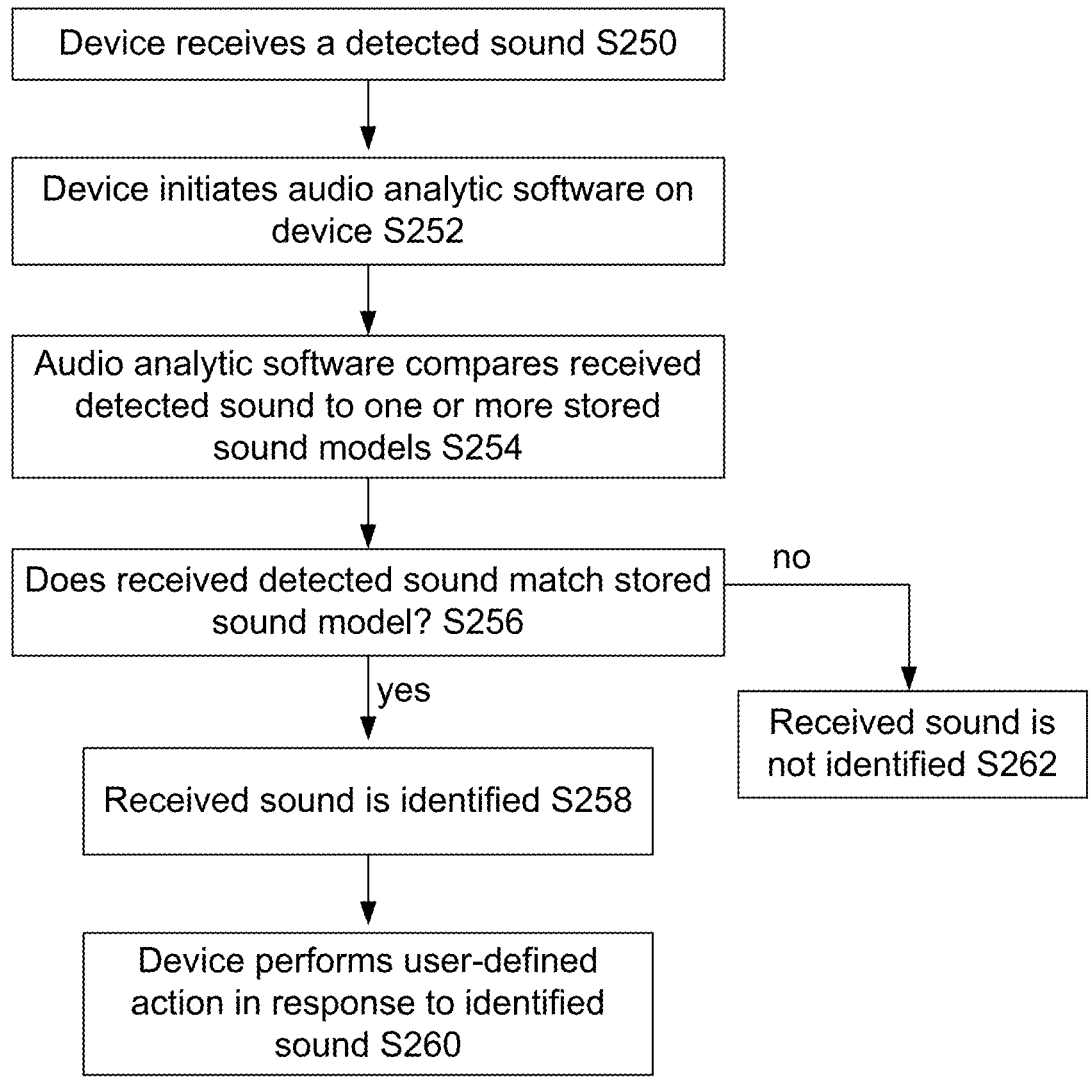
FIG. 2b is a flow chart showing example steps of a process to identify a detected sound using a sound model.

FIG. 2b is a flow chart showing example steps of a process to identify a detected sound using a sound model. A device receives a detected sound (S250), either via its own sound capture module (e.g. a microphone and associated software), or from a separate device. The device initiates audio analytics software stored on the device (S252) in order to analyse the detected sound. The audio analytics software identifies the detected sound by comparing it to one or more sound models stored within the device (S254). If the detected sound matches one of the stored sound models (S256), then the sound is identified (S258). If an action has been defined and associated with a particular sound/sound model, then the device is preferably configured to implement the action in response to the identification of the sound (S260). For example, the device may be configured to send a message or email to a second device, or to otherwise alert a user to the detection. If the detected sound does not match one of the stored sound models, then the detected sound is not identified (S262) and the process terminates. This means that in an environment such as a home, where many different sounds may be detected, only those sounds which the user has specifically captured (and for which sound models are generated) can be detected.

The device is preferably configured to detect more than one sound at a time. In this case, the device will run two analytics functions simultaneously. An indication of each sound detected and identified is provided to the user.

4. Example Systems to Capture and Identify Sounds

Figure 3:
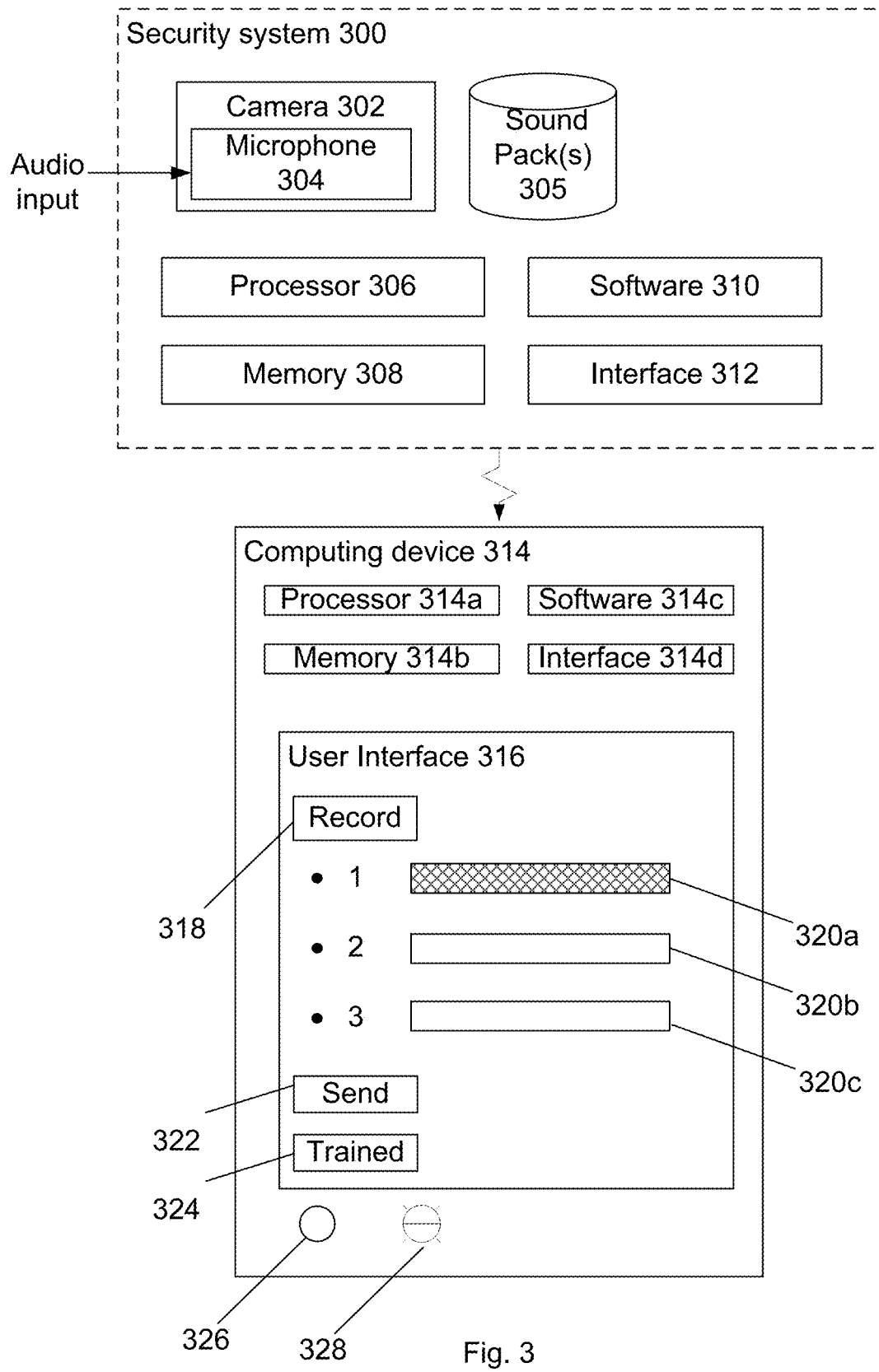
FIG. 3 is a block diagram showing a specific example of a system to capture and identify sounds.

FIG. 3 is a block diagram showing a specific example of a system to capture and identify sounds. The system comprises a security system 300 which is used to capture sounds and identify sounds. (It will be understood that the security system is just an example of a system which can be used to capture and identify sounds.) The security system 300 can be used to capture more than one sound and to store the sound models associated with each captured sound. The security system comprises a processor 306 coupled to memory 308 storing computer program code 310 to implement the sound capture and sound identification, and to interfaces 312 such as a network interface. A wireless interface, for example a Bluetooth®, Wi-Fi or near field communication (NFC) interface is provided for interfacing with a computing device 314.

The security system 300 comprises a security camera 302 and a sound capture module or microphone 304. The security system 300 comprises a data store 305 storing one or more sound models (or "sound packs"). In embodiments, the sound model for each captured sound is generated in a remote sound analytics system (not shown), such that a captured sound is sent to the remote analytics system for processing. In this illustrated embodiment, the security system 300 is configured to capture sounds in response to commands received from a computing device 314, which is coupled to the security system. The computing device 314 may be a user device such as a PC, mobile computing device, smartphone, laptop, tablet-PC, home automation panel, etc. Sounds captured by the microphone 304 are transmitted to the computing device 314, and the computing device 314 sends these to a remote analytics system for analysis. The remote analytics system returns a sound model for the captured sound to the device 314, and the device 314 provides this to the security system 300 for storage in the data store 305. This has an advantage that the security system which captures and identifies sounds, and the device 314 which is coupled to the analytics system, do not require the processing power or any specific software to analyse sounds and generate sound models. Another advantage is that the security system 300 stores the sound models locally (in data store 305) and so does not need to be in constant communication with the remote system or with the computing device 314 in order to identify a detected sound.

The computing device 314 may be a user device such as a PC, mobile computing device, smartphone, laptop, tablet-PC, home automation panel, etc., and comprises a processor 314a, a memory 314b, software to perform the sound capture 314c and one or more interfaces 314d. The computing device 314 may be configured to store user-defined or user-selected actions which are to be taken in response to the identification of a particular sound. A user interface 316 on the computing device 314 enables the user to perform the sound capture and to select actions to be taken in association with a particular sound. The user interface 316 shown here is a display screen (which may be a touchscreen) which, when the sound capture software is running on the device 314, displays a graphical user interface to lead the user through a sound capture process. For example, the user interface may display a "record" button 318 which the user presses when they are ready to capture a sound via the microphone 304. The user preferably presses the record button 318 at the same time as playing the sound to be captured (e.g. a doorbell or smoke alarm). In this illustrated example, the user is required to play the sound and record the sound three times before the sound is sent to a remote analytics system for analysis. A visual indication of each sound capture may be displayed via, for example, progress bars 320a, 320b, 320c. Progress bar 320a is shown as hatched here to indicate how the progress bar may be used to show the progress of the sound capture process—here, the first instance of the sound has been captured, so the user must now play the sound two more times.

Once the sounds have been captured successfully, the user interface may prompt the user to send the sounds to the remote analytics system, by for example, displaying a "send" button 322 or similar. Clicking on the send button causes the computing device 314 to transmit the recorded sounds to the remote system. When the remote system has analysed the sound and returned a sound pack (sound model) to the device 314, the user interface may be configured to display a "trained" button 324 or provide a similar visual indication that a sound model has been obtained. Preferably, the sound pack is sent by the device 314 to the security system and used by the security system to identify sounds, as this enables the security system to detect and identify sounds without requiring constant communication with the computing device 314. Alternatively, sounds detected by the security system microphone 304 may be transmitted to the computing device 314 for identification. When a sound has been identified by the security system, it may send a message to the computing device 314 to alert the device to the detection. Additionally, the security system may perform a user-defined action in response to the identification. For example, the camera 302 may be swiveled into the direction of the identified sound.

The device 314 comprises one or more indicators, such as LEDs. Indicator 326 may be used to indicate that the device has been trained, i.e. that a sound pack has been obtained for a particular sound. The indicator may light up or flash to indicate that the sound pack has been obtained. This may be used instead of the trained button 324. Additionally or alternatively, the device 314 may comprise an indicator 328 which lights up or flashes to indicate that a sound has been identified by the security system.

FIG. 4a shows a schematic of a device configured to capture and identify sounds in an embodiment of the invention. As described earlier with reference to FIGS. 1a to 1c, a device 40 may be used to perform both the sound capture and the sound processing functions, or these functions may be distributed over separate modules. Thus, one or both of a sound capture module 42, configured to capture sounds, and a sound processing module 44, configured to generate sound models for captured sounds, may be provided in a single device 40, or as separate modules which are accessible by device 40. The sound capture module 42 may comprise analytics software to identify captured/detected sounds, using the sound models generated by the sound processing module 44. Thus, audio detected by the sound capture module 42 is identified using sound models generated by module 44, which may be within device 40 or remote to it.

FIG. 4b is an illustration of a smart microphone configured to capture and identify sounds in an embodiment of the invention. The smart microphone or smart device 46 preferably comprises a sound capture module (e.g. a microphone), means for communicating with an analytics system that generates a sound model, and analytics software to compare detected sounds to the sound models stored within the device 46. The analytics system may be provided in a remote system, or if the smart device 46 has the requisite processing power, may be provided within the device itself. The smart device comprises a communications link to other devices (e.g. to other user devices) and/or to the remote analytics system. The smart device may be battery operated or run on mains power.

Figure 5:
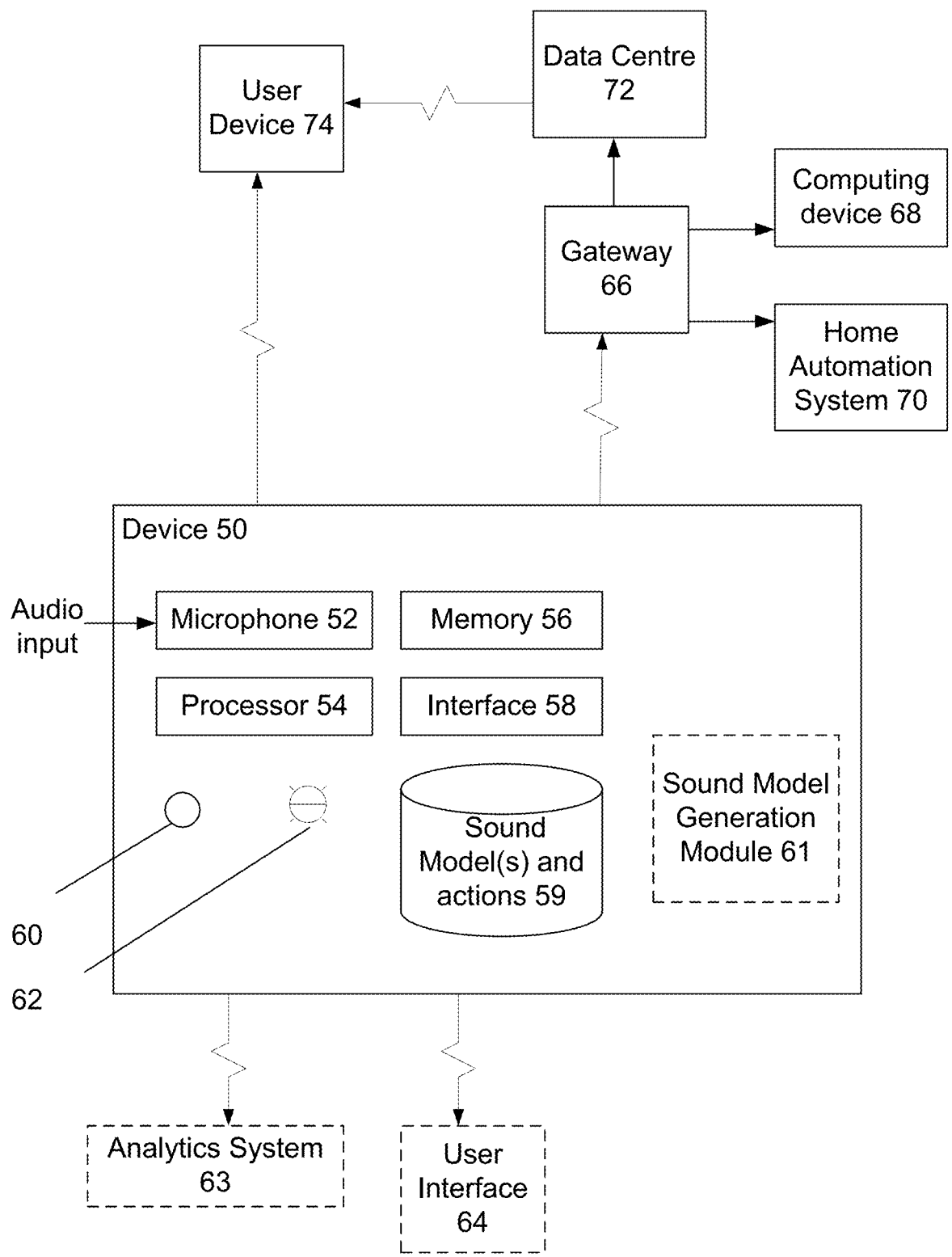
FIG. 5 is a block diagram showing another specific example of a system used to capture and identify sounds.

FIG. 5 is a block diagram showing another specific example of a device used to capture and identify sounds. The system comprises a device 50 which is used to capture sounds and identify sounds. For example, the device 50 may be the smart microphone illustrated in FIG. 4b. The device 50 comprises a microphone 52 which can be used to capture sounds and to store the sound models associated with each captured sound. The device further comprises a processor 54 coupled to memory 56 storing computer program code to implement the sound capture and sound identification, and to interfaces 58 such as a network interface. A wireless interface, for example a Bluetooth®, Wi-Fi or near field communication (NFC) interface is provided for interfacing with other devices or systems.

The device 50 comprises a data store 59 storing one or more sound models (or "sound packs"). In embodiments, the sound model for each captured sound is generated in a remote sound analytics system 63, such that a captured sound is sent to the remote analytics system for processing. Alternatively, the sound model may be generated by a sound model generation module 61 within the device 50. In this illustrated embodiment, the device 50 is configured to capture sounds in response to commands received from a user. The device 50 comprises one or more interfaces to enable a user to control to the device to capture sounds and obtain sound packs. For example, the device comprises a button 60 which a user may depress or hold down to record a sound. A further indicator 62, such as an LED, is provided to indicate to the user that the sound has been captured, and/or that further recordings of the sound, and/or that the sound can be transmitted to the analytics system 63 (or sound model generation module 61). The indicator 62 may flash at different rates or change colour to indicate the different stages of the sound capture process. The indicator 62 may indicate that a sound model has been generated and stored within the device 50.

The device 50 may, in embodiments comprise a user interface to enable a user to select an action to associate with a particular sound. Alternatively, the device 50 may be coupled to a separate user interface 64, e.g. on a computing device or user device, to enable this function. When a sound has been identified by device 50, it may send a message to a user device 74 (e.g. a computing device, phone or smartphone) coupled to device 50 to alert the user to the detection, e.g. via Bluetooth® or Wi-Fi. Additionally or alternatively, the device 50 is coupled to a gateway 66 to enable the device 50 to send an SMS or email to a user device, or to contact the emergency services or to control a home automation system, as defined by a user for each sound model.

For example, a user of device 50 may specify for example, that the action to be taken in response to a smoke alarm being detected by device 50 is to send a message (e.g. an SMS message or email) to computing device 68 (e.g. a smartphone, PC, tablet, phone). The device 50 is configured to send this message via the appropriate network gateway 66 (e.g. an SMS gateway or mobile network gateway). The action to be taken in response to the sound of a doorbell ringing may be for example, to turn on a light in the house. (This may be used to, for example, give the impression that someone is in the house, for security purposes). In this case, the device 50 is configured to send this command to a home automation system 70 via the gateway, such that the home automation system 70 can turn on the light, etc.

Another example is if the sound detected is the word "help", "fire" or a smoke alarm. In this case, the device 50 may be configured to send an appropriate message to a data centre 72, which can contact the emergency services. The message sent by device 50 may include details to contact the user of device 50, e.g. to send a message to user device 74.

No doubt many other effective alternatives will occur to the skilled person. It will be understood that the invention is not limited to the described embodiments and encompasses modifications apparent to those skilled in the art lying within the spirit and scope of the claims appended hereto.

We claim:

1. A sound capturing and identifying device, the device comprising:

a microphone coupled to the device to detect a sound;

an interface for a button wherein the button is configured to, when pressed, cause the device to capture the sound, the interface comprising a display screen;

a memory for storing the captured sound;

a communication means for transmitting the captured sound to a remote analytics system located remote to the device; and a processor configured to:

receive, via the display screen, a user selection of an action to be performed in response to an identification of the captured sound;

store said user selection in the memory;

store a sound model for the captured sound in the device by:

receiving a message indicating the button has been pressed;

capturing an example sound detected by the microphone in response to receiving said message;

in response to completion of said capturing, transmitting in a single transmission the captured example sound to the remote analytics system; and in response to transmitting said single transmission, receiving and storing a sound model from the remote analytics system, wherein the sound model has been created by the remote analytics system in response to the remote analytics system (i) receiving the captured example sound transmitted in said single transmission (ii) processing the captured example sound of said single transmission and (iii) generating parameters for the captured example sound of said single transmission, wherein the sound model is transmitted to the device in response to said creation of the sound model by the remote analytics system and further wherein the sound model corresponds to the captured example sound transmitted in said single transmission and comprises said parameters which enable the device to identify a detected sound; and analyze a detected sound using the device to identify the sound by:
comparing the detected sound to the stored sound model to identify the detected sound when detected by the microphone; and
implement the action for the captured sound based on the detected sound being identified as the captured sound.

2. The device of claim 1, wherein the interface for the button comprises a physical button on the device.

3. The device of claim 1, wherein the interface for the button comprises a virtual button displayed on a user interface the display screen.

4. The device of claim 3, wherein a user interface is provided on the display screen.

5. The device of claim 1, wherein:
the sound capturing and identifying device is coupled to a user device; and
a user interface provided on the user device is configured to control the sound capturing and identifying device.

6. The device of claim 1, further comprising at least one indicator to indicate the progress of the sound capture.

7. The device of claim 6, wherein the at least one indicator comprises an LED provided on the sound capturing and identifying device.

8. The device of claim 6, wherein the at least one indicator is provided on a user interface.

9. The device of claim 1, wherein the action comprises sending a message to a consumer electronics device upon identification of the sound.

10. The device of claim 1, wherein the action comprises controlling one or more devices coupled to the sound capturing and identifying device.

11. The device of claim 1, wherein the processor is further configured to process the captured example sound prior to transmitting the captured example sound to the remote analytics system.

12. The device as claimed in claim 1, wherein the communication means for transmitting the captured example sound to the remote analytics system is a wired or a wireless communication means.

13. The device of claim 1, further comprising:
a sound capture module configured to capture a sound; and
a sound processing module configured to store a sound model for the captured sound in the device, and analyze a detected sound using the device to identify the sound.

14. The device of claim 13, wherein the functionalities of the sound capture module and the sound processing module are distributed.

15. The device of claim 1, wherein the device is a dedicated device for capturing and identifying sounds.

16. The device of claim 1, wherein the sounds captured and identified by the device exclude speech.

17. The device of claim 1, wherein the action comprises providing a visual indication on the device.

18. The device of claim 17, wherein the action comprises displaying a message on the display screen.

19. The device of claim 17, wherein the action comprises turning on a visual indicator of the device.

20. The device of claim 1, wherein, in response to the device receiving and storing the sound model from the remote analytics system, the display screen is configured to display a visual notification that indicates to the user that the sound model has been generated and is stored in the memory.

21. The device of claim 1, wherein the display screen is configured to enable a user to select the action for the captured sound from a pre-defined list of actions displayed on the display screen.

22. A method of capturing and identifying a sound, the method comprising steps to generate a sound model for a recorded sound by:
using a microphone to capture an example sound;
receiving via a display screen, a user selection of an action to be performed in response to an identification of the captured sound;
storing said user selection;
in response to completion of said capturing, transmitting in a single transmission the captured example sound from a device to an analytics system for analysis; and
in response to transmitting said single transmission, receiving and storing a sound model at the device from the analytics system, wherein the sound model has been created in response to the analytics system: (i) receiving the captured example sound transmitted in said single transmission (ii) processing the captured example sound of said single transmission and (iii) generating parameters for the captured example sound of said single transmission, wherein the sound model is transmitted to the device in response to said creation of the sound model by the remote analytics system, and further wherein the sound model corresponds to the captured example sound transmitted in said single transmission and comprises said parameters that enable the device to identify a detected sound;
analyzing a detected sound to identify the sound by:
receiving as an input a sound detected by the microphone; and
comparing the detected sound to the stored sound model to identify the detected sound; and
implementing the action for the captured sound based on the detected sound being identified as the example sound.

23. The method of claim 22, further comprising providing a device with access to audio analytic software configured to analyze the sound detected by the microphone.

24. The method of claim 23, wherein the device comprises an interactive software application having access to the audio analytic software, wherein the interactive software application is configured to enable user interaction with the device to generate the sound model for the recorded sound.

25. The method of claim 23, wherein the device comprises the analytics system to generate the sound model for the captured sound, and wherein the step of receiving and storing a sound model comprises receiving the sound model from the analytics system in the device.

26. The method of claim 22, wherein the analytics system to generate the sound model for the captured sound is provided in a remote server or a network of remote servers hosted on the Internet, and wherein the step of receiving and storing a sound model comprises receiving the sound model from the remote server.

27. The method of claim 22, wherein the device comprises said display screen.

28. The method of claim 22, wherein a remote computing device comprises said display screen.

29. A non-transitory data carrier carrying processor control code that when running on a device causes the device to perform the method of claim 22.

30. A system for generating a sound model, the system comprising:
- a device comprising one or more sound capture/processing modules configured to:
  - capture an example sound; and
  - store a sound model corresponding to the captured example sound in response to completion of said capturing;
- a sound model generating module; and
- a communication channel through which:
  - a single transmission comprising an example sound captured by the device is sent from the one or more sound capture and/or processing modules to the sound model generating module for analysis wherein the sound model is created in response to receiving the single transmission by processing the captured example sound of said single transmission and generating parameters for the captured example sound of said single transmission; and
  - the sound model generated by the sound model generating module in response to receiving the captured example sound of said single transmission is returned to the device, wherein the sound model is transmitted to the device in response to said creation of the sound model by the remote analytics system;
wherein the one or more sound capture/processing modules is further configured to:
  - receive as an input a detected sound; and
  - analyze the detected sound by comparing the detected sound to the stored sound models to identify the detected sound,
wherein the device further comprises an interface having a display screen,
wherein the sound capture/processing modules is further configured to:
  - receive, via the display screen, a user selection of an action to be performed in response to an identification of the example sound;
  - store said user selection in the memory; and
  - implement the action for the example sound based on the detected sound being identified as the example sound.

31. The system of claim 30, wherein the sound model generating module is provided in a remote server or a network of remote servers hosted on the Internet, and a sound recorded by the device is sent to the remote server or network of remote servers for analysis.

32. The system of claim 30, wherein the sound model generating module analyzes a sound recorded by the device and generates a sound model comprising a set of parameters characterizing the recorded sound.

* * * * *